United States Patent Office 3,424,029
Patented Jan. 28, 1969

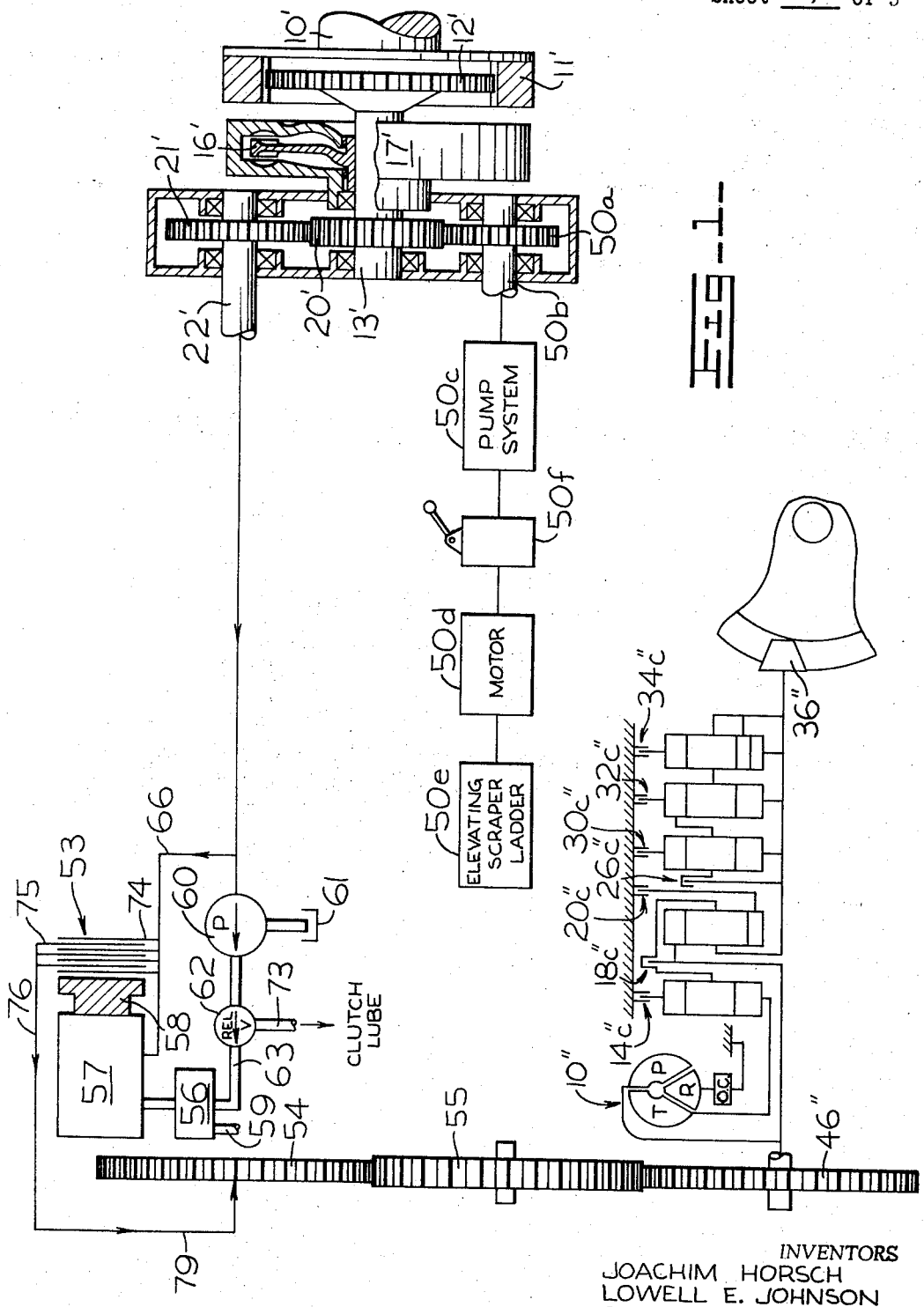

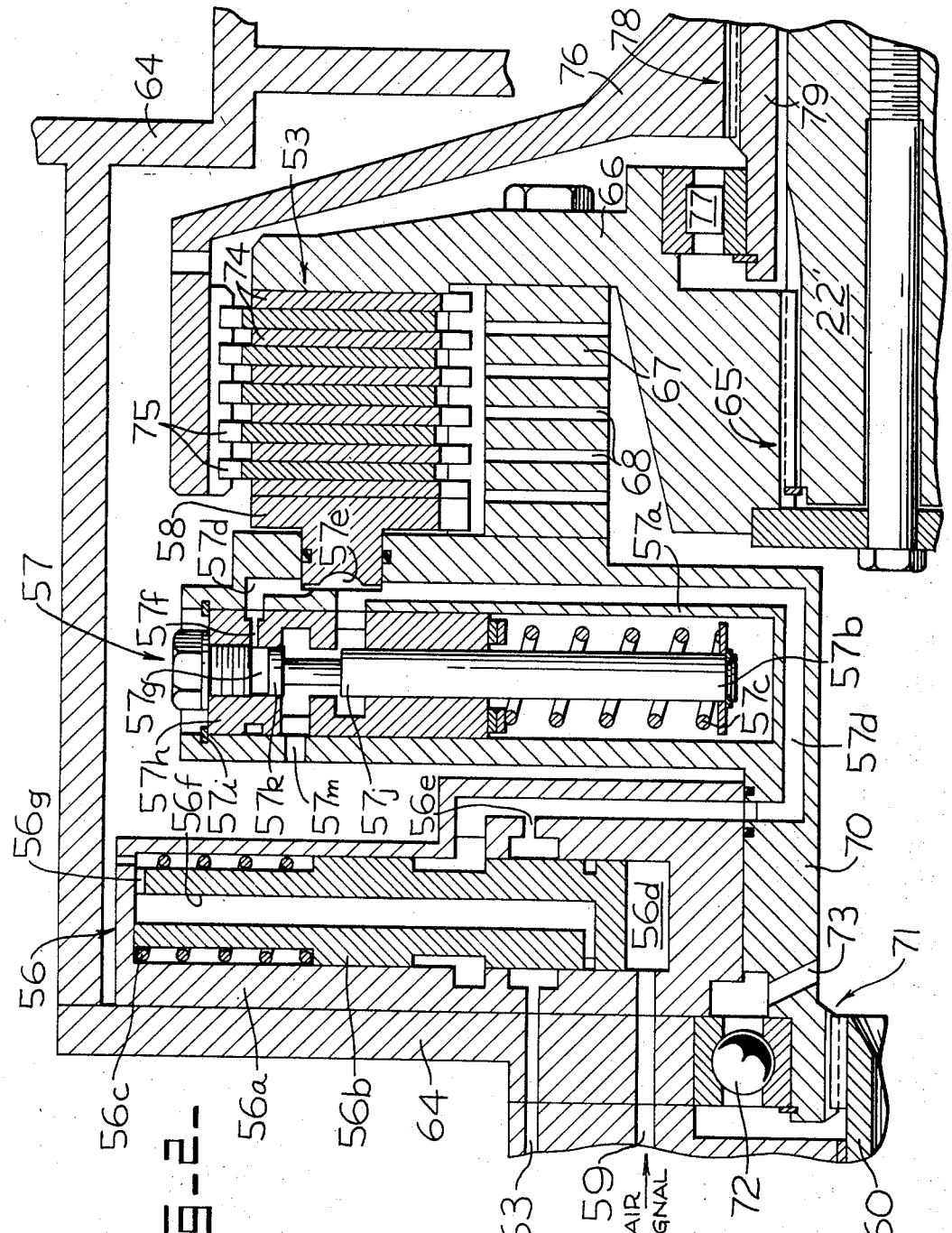

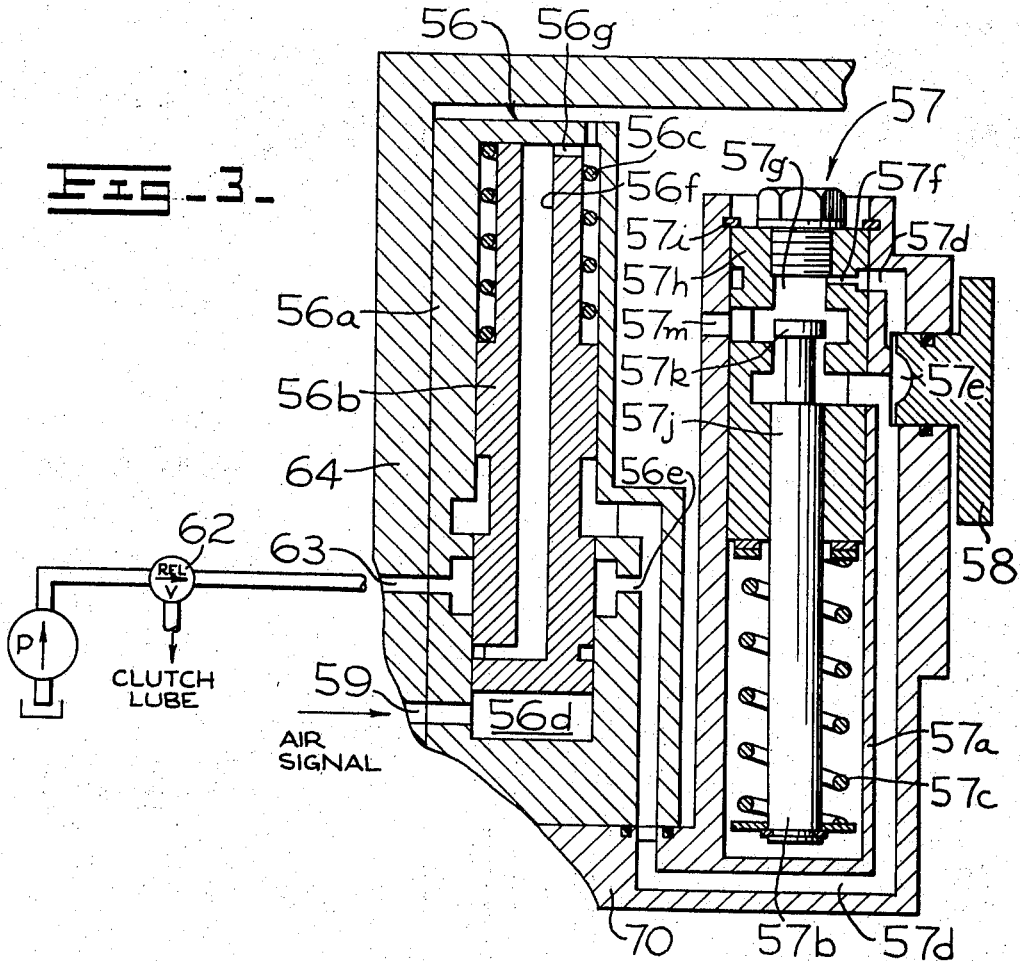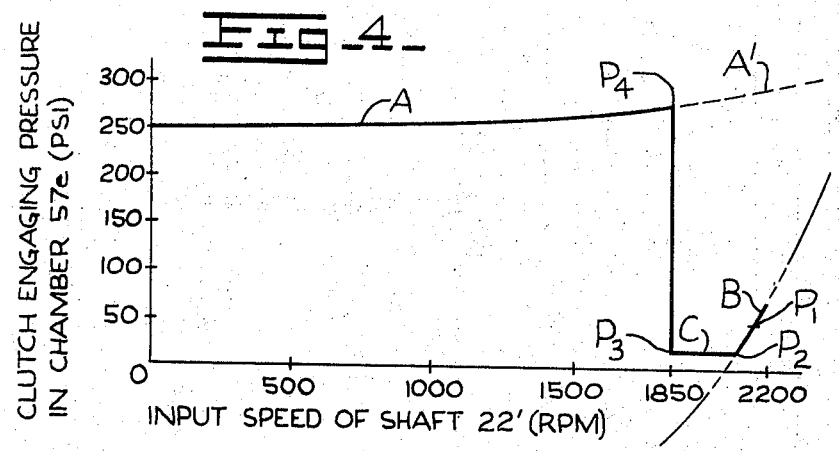

3,424,029
POWER TRANSMISSION
Joachim Horsch, Washington, and Lowell E. Johnson and Shairyl I. Pearce, East Peoria, Ill., assignors to Caterpillar Tractor Co., Peoria, Ill., a corporation of California
Filed Aug. 1, 1966, Ser. No. 569,331
U.S. Cl. 74—664                    17 Claims
Int. Cl. F16h *37/06;* F16d *23/10*

ABSTRACT OF THE DISCLOSURE

A vehicle has a power transmission dividing its engine's power between a primary power train having a slipping clutch and a secondary power train adapted to drive an auxiliary implement of the vehicle. Control means are operatively associated with the slipping clutch to infinitely apportion engine power between the two power trains during vehicle operation.

---

This invention relates to a power transmission and more particularly relates to a power transmission comprising a slipping clutch arrangement. Such arrangement is preferably controlled to selectively apportion the power output of a vehicle's engine between the vehicle's ground engaging wheels and a power actuated implement.

Earthmoving vehicles, such as wheel tractor-scrapers, require efficient engines and attendant transmissions for carrying forth earthmoving operations which subject such vehicles to a wide variety of operating conditions. Conventional scrapers are generally equipped with an attached implement, such as an elevating scraper ladder, constructed and arranged to be driven by the vehicle's engine. The engine may be arranged to apportion the engine's power output between the vehicle's ground-engaging wheels and the mechanism employed for selectively actuating the attached ladder during a loading phase of vehicle operation. The load imposed upon the engine during this operational phase is quite high and varies continually due to the power demanded by the ladder for earth loading purposes.

Such power demand oftentimes increases to a point whereat the engine "lugs down" in speed, thus resulting in a reduction in power input to the ladder during the most critical period of vehicle operation. Thus, it is desirable to provide a power transmission and control system therefor arranged to selectively and efficiently apportion the engine's power output between the vehicle's variable speed transmission and the power actuated implement, particularly during such a loading phase of vehicle operation. In addition, it is further desirable to transfer the engine's full power input to the vehicle's wheels during a non-loading or hauling phase of vehicle operation, i.e., during the operational phase wherein the implement is not actuated.

This invention overcomes the above, briefly described problems by providing a power transmission and control system having a slipping drive establishing means, preferably a hydraulically actuated clutch, arranged between an engine's power output and a vehicle's final wheel drive to apportion the power output between such drive and the mechanism employed to actuate an attached implement. The clutch is arranged to slip in a controlled manner, particularly during that portion of a loading cycle wherein the power demanded by the implement is quite high. In the preferred embodiment, control means are provided for permitting the clutch to slip automatically in response to engine r.p.m. Such control means preferably comprises an air actuated selector control valve operatively associated with a centrifugally operated valve arranged for controlling clutch engagement.

An object of this invention is to provide a power transmission comprising means for maintaining near maximum or rated engine speed during all phases of vehicle operation.

Another object of this invention is to provide a power transmission comprising a slipping clutch arrangement, preferably in combination with a torque converter, wherein the power output of a vehicle's engine may be efficiently apportioned between the vehicle's variable speed transmission and a power actuated implement during all phases of vehicle operation.

A further object of this invention is to provide a power transmission comprising a slipping clutch arrangement and control means therefor whereby clutch slippage may be accurately and automatically controlled in response to the speed of a power input means.

A still further object of this invention is to provide a slipping clutch arrangement and control means therefor which inherently decreases the torque input to a vehicle's ground engaging wheels to prevent slippage thereof during critical phases of vehicle operation.

A still further object of this invention is to provide a power transmission comprising an efficient and economical slipping clutch arrangement constructed and arranged in a noncomplex manner to facilitate assembly and disassembly for servicing purposes.

Further and more specific objects of this invention will become apparent from the following description and accompanying drawings, wherein:

FIG. 1 schematically illustrates a power transmission employing novel aspects of this invention;

FIG. 2 is a cross-sectional view of a preferred slipping clutch arrangement and control valve means therefor;

FIG. 3 is a cross-sectional view similar to FIG. 2 illustrating the control valve means as it would appear during operation thereof; and FIG. 4 is a diagrammatic view illustrating a performance curve for the aforementioned slipping clutch arrangement.

FIG. 1 illustrates a power transmission embodying novel aspects of this invention comprising a primary power train, having input and output portions which are fully disclosed in two co-pending applications, assigned to the assignee of this invention. Numerals disclosed in FIG. 1 accompanied by a prime symbol (') correspond to those in United States patent application Serial No. 508,890, now Patent No. 3,352,385, entitled "Hydrodynamic Retarder" and filed on November 22, 1965, by Lowell E. Johnson. The retarder assembly or input portion of the transmission comprises a power input or engine driven shaft 10' suitably arranged to drive a flywheel 11'. A gear 12' is preferably splined to the flywheel to drive a shaft 13' which in turn drives a retarder rotor 16'. Rotor shaft 13' is suitably arranged to drive transfer gears 20' and 21' and shaft 22'.

A secondary power train comprises a gear 50a, driven by gear 20', arranged to drive a shaft 50b to provide a power input to an implement attached to an earthmoving vehicle, for example. In the embodiment disclosed, shaft 50b may be suitably arranged to drive a pump system 50c and motor 50d which in turn are adapted to selectively actuate a conventional elevating scraper ladder 50e by control valve 50f. It should be understood that other suitable implements may be attached to output shaft 50b for vehicles other than scrapers to receive a portion of the power input afforded by engine driven shaft 10'. For example, shaft 50b could be arranged to drive a hydraulic pump for controlling the actuation of conventional loader buckets.

United States patent application Serial No. 467,267, now Pat. No. 3,347,113, entitled "Transmission" and filed on June 28, 1965, by Charles A. Ramsel, discloses the specific constructions and arrangements of the illustrated multiple speed transmission and control system for the output portion of the power transmission illustrated in FIG. 1. The numerals disclosed in FIG. 1 correspond to those appearing in the last-mentioned application, and are accompanied by a double-prime symbol ("). As illustrated, a transfer gear 46" is arranged to provide a power input to the multi-speed assembly comprising a torque converter 10' and a series of suitably arranged brakes and clutches adapted to be selectively actuated. Clutches and/ or brakes 14c", 18c", 20c", 26c", 30c", 32c" and 34c" are suitably arranged to selectively drive an output member or pinion gear 36" operatively connected to a face gear of the vehicle's differential.

This invention is primarily directed to a drive establishing means 53, preferably a multi-disced friction slip clutch means, suitably arranged to selectively connect shaft 22' to torque converter 10" of the output portion of the transmission, via transfer gears 54, 55 and 46". A control means comprising a selector control valve 56 and a speed responsive or centrifugally actuated valve 57, are arranged to selectively move piston 58 for clutch engagement purposes. A conventional air control valve (not shown) is preferably employed to communicate pressurized air through conduit 59 for selective actuation of valve 56. Other types of on-off control means may be utilized, such as suitably arranged mechanical or hydraulic actuators. A pump 60, preferably driven by shaft 22', is arranged to pump pressurized fluid from sump 61 through a conventional relief valve 62 to communicate such fluid to selector valve 56. As schematically illustrated in this figure relief valve 62 set at 250 p.s.i., for example, may be arranged to communicate a portion of the relieved fluid to the clutch for cooling and lubrication purposes.

FIG. 2 discloses the specific constructions and arrangements of slipping clutch arrangement 53, the control means and attendant structures. A stationary outer housing 64 is arranged to enclose the above-mentioned structure's clutch and valve, including the output portion of input shaft 22' which is splined or otherwise suitably connected at 65 to a clutch thrust plate 66. A suitably arranged ring gear 67 provides drilled oil passages 68 for clutch lubrication purposes, as will be hereinafter explained. An inner housing 70 is secured to thrust plate 66 and gear 67 to rotate therewith upon rotation of shaft 22'. Housing 70 is further operatively connected to pump 60 (FIG. 1) via spline connection 71. The left end of the housing 70 is journalled in housing 64 by bearing means 72. As further illustrated, one or more passages or lubricating means 73 may be arranged to communicate cooling fluid from pump 60 through relief valve 62 (not shown in FIG. 2) and to passages 68 for clutch cooling and lubrication purposes.

Drive establishing means 53 comprises a plurality of radially disposed clutch plates 74 suitably splined to ring gear 67 and thus thrust plate 66 in a conventional manner to be compressed against driven clutch plates 75, splined to a drum 76 by piston 58. It should be understood that the drive establishing means could alternatively comprise a conventional fluid clutch, magnetically actuated clutch or the like, integrated with a suitable control means. The drum is mounted in bearing means 77 and splined at 78 to thus provide a power output from shaft 22' to a shaft 79. In turn, shaft 79 is operatively connected to gear 54 (FIG. 1) to transfer such power to the vehicle's differential.

Selector control valve means 56 comprises a housing 56a secured to stationary outer housing 64. The valve preferably comprises a two position spool 56b normally biased downwardly to a first position by a compression spring 56c to a closed position when the vehicle's implement is using little, if any, power. When the vehicle's implement is utilized for earth loading purposes, for example, the spool is moved upwardly to a second position by the operator due to the communication of pressurized air to a chamber 56d via passage 59. With the valve in this position, pressurized fluid flows from passage 63 through a flow limiting orifice 56e to limit the flow rate to valve 57 to approximately 3 g.p.m., for example. A passage 56f is preferably formed in spool member 56b to communicate with drilled passage 56g to return fluid to the sump which fluid might otherwise seep into air chamber 56d.

Centrifugal valve means 57 comprises a housing 57a having a spool 57b slidably mounted therein. The spool is urged downwardly in FIG. 2 or inwardly towards an extended longitudinal axis of shaft 22' by a heavy spring 57c. In addition, as will be hereinafter more fully explained, pressurized fluid is communicated via orifice 56e, a passage 57d, a clutch actuating chamber 57e, and an orifice 57f, to pressurize a reaction chamber 57g and aid spring 57c in urging valve 57b downwardly. The portion of passage 57d in rotating member 70 terminates in an annulus to constantly communicate with orifice 56e. It can be seen that rotation of shaft 22' will cause thrust plate 66 and thus valve housing 57a to rotate to urge valve spool 57b, radially outwardly relative to the extended axis of shaft 22'. A housing insert 57h is suitably secured within housing 57a by snap ring 57i and has a plurality of lands and passages suitably formed therein which cooperate with lands 57j and 57k of valve spool 57b to form metering passages.

Operation of the above disclosed clutch and control means therefor will now be explained with particular reference to FIG. 4. Moving along substantially flat curves A and A' in this figure, it can be seen that relief valve 62 may be set at approximately 250 p.s.i. to normally communicate such pressure to clutch 53 directly during a fully engaged condition of clutch operation, i.e., with chamber 56d depressurized during a non-loading phase of vehicle operation, for example. Note, however, that FIG. 4 illustrates a pressure trace taken in chamber 57e which varies from a straight, horizontal line (for a fixed 250 p.s.i.) since it is influenced by the centrifugal head of fluid positioned radially inwardly of the chamber. Passages 73 and 68 are arranged to communicate relieved cooling fluid to clutch plates 74 and 75 for cooling and lubrication purposes. As above stated, when air pressure is relieved in passage 59 and chamber 56d, valve spool 56b is urged downwardly by spring 56c to permit the full fluid pressure to be communicated from passage 63 to chamber 57e to urge piston 58 against clutch plates 74 and 75 to fully engage same. Such a condition of valve operation is generally maintained by the operator when the elevating scraper ladder or other earthmoving implement is using little if any power for earth loading purposes. Orifice 57m is sufficiently small so that during such operation approximately 250 p.s.i. will be maintained in chamber 57e in relation to available pump flow of 10 g.p.m.

Actuation of an air control valve (not shown) functions to pressurize chamber 56d, below valve spool 56b, to move the spool upwardly to the position illustrated in FIGS. 2 and 3. Pressurized fluid will now flow from passage 63, through restricting orifice 56e and passage 57d, and into clutch actuating chamber 57e. Orifice 56e may be suitably sized to limit fluid flow to 3 g.p.m., for example. An equilibrium is then established so that at rated engine conditions, such as 2200 r.p.m., 70 p.s.i. is prevalent in clutch chamber 57e to hold the clutch plates fully engaged. Orifice 57m is large enough to allow valve 57b to regulate the desired 70 p.s.i. at 3 g.p.m. flow. However, when a load is imposed upon elevator drive mechanism 50a–50c (FIG. 1) engine r.p.m. and thus the r.p.m. of centrifugal valve 57 drops to cause a responsive drop in fluid pressure in the clutch chamber as reflected by parabolic curve B. A relatively steep slope, i.e., large change in clutch engaging pressure for a small drop in engine r.p.m., should be noted. Such slope is primarily occasioned by the setting of heavy spring means 57c. At some point P1 on curve B, clutch slippage begins and an increasing percentage of available horsepower is directed to the implement circuit via shaft 50b (FIG. 1). For example, at 2100 r.p.m. approximately 60 percent of the torque or horsepower may be so directed.

At the above mentioned rated conditions as reflected by curve B, i.e., with approximately 70 p.s.i. fluid pressure in chamber 57e, valve spool 57b would assume the position illustrated in FIG. 2. Approximately 3 g.p.m. would be directed to the spool via passage 57d and communicated to a drain orifice 57m via the metering passage formed at land 57j. The upper portion of passage 57d communicates with reaction chamber 57g via a restricted orifice 57f in the manner above explained to aid in modulating spool 57b along with spring 57c, i.e., against the centrifugal force imposed thereon.

Increasing implement loads are effective to move valve spool 57b radially inwardly, as reflected by parabolic curve B, in response to a reduction of engine r.p.m. to thus move to point P2 on curve C. At point P2, valve 57b stops its regulating function at the metering means formed at land 57j i.e., such metering means is positioned fully open. Between points P2 and P3 on curve C orifice 57m maintains 20 p.s.i. in chamber 57e in conjunction with the constant 3 g.p.m. flow rate. A balanced condition is achieved wherein no change in the fluid pressure maintained in chamber 57e occurs even though engine r.p.m. continues to drop to approximately 1850 r.p.m. As above mentioned, such a desirable condition (between points P2 and P3 in FIG. 4) is primarily obtained by suitably sizing orifice 57m to control fluid out flow to the minimum required fluid pressure in chamber 57e. Thus, clutch 53 will always be at least partially engaged to continually direct power to the output portion of the transmission (FIG. 1).

Orifice 57m continues to control the minimum fluid pressure required for clutch engagement by affording a predetermined restriction to combined fluid flow across orifice 57f and the passage formed at land 57j (FIG. 3). At speeds below 1850 r.p.m. a condition is reached wherein spring 57c functions to overcome the lowered centrifugal force (due to decreased engine r.p.m.) to thus move valve spool 57b to close the metering passage formed at the lower edge of land 57k. Fluid flow is thus restricted through orifice 57f; such orifice not having the capacity to permit the full 3 g.p.m. to flow therethrough. Therefore, fluid pressure builds up rapidly in chamber 57e as illustrated by the vertically disposed line between points P3 and P4 in FIG. 4 until a maximum clutch engaging fluid pressure of approximately 250 p.s.i. is reached.

As above mentioned, when the vehicle is moving to transport the loaded material, for example, the air control valve is generally shut off to relieve the pressurized air previously maintained in chamber 56d. Spring 56c will function to urge valve spool 56b downwardly in FIG. 2 to thus directly communicate full pump flow from passages 63 through passage 57d and into chamber 57e to fully engage clutch 53 at the substantially constant fluid pressure reflected by curves A and A'.

In addition to the aforementioned desiderata, the above disclosed invention provides a single line communication from stationary passage 63 to rotating passage 57d and the associated control valve means. Fluid pressure prevalent in chamber 57e can thus be measured in passage 57d, adjacent orifice 56e. In addition, the above arrangements provide for the close control and regulation of fluid pressure in chamber 57e to a level below the pressure head in passage 57d, occasioned by centrifugal head. Also, the control means is arranged to communicate more lubricating and cooling fluid to clutch 53, via passages 68, when the clutch is slipping than when it is fully engaged.

We claim:

1. In a vehicle, a power transmission comprising power input means and primary and secondary power trains operatively connected to said input means, said primary power train comprising a slipping drive establishing means, said secondary power train comprising auxiliary implement means attached to said vehicle for performing work independently of said primary power train and control means directly responsive to the speed of said power input means for selectively and infinitely varying the engagement of said drive establishing means whereby the power output of said input means is apportioned between said primary and secondary power trains, respectively.

2. The invention of claim 1 wherein said drive establishing means comprises a slip clutch means having an actuating chamber and means for communicating fluid pressure to said actuating chamber.

3. The invention of claim 1 wherein said primary power train comprises a torque converter.

4. The invention of claim 2 wherein said speed responsive means comprises a centrifugal valve means.

5. The invention of claim 4 wherein said centrifugal valve means comprises a spring means for causing a large increase in fluid pressure maintained in said chamber in response to a relatively small increase in the speed of said input means.

6. The invention of claim 2 further comprising lubricating means for communicating more cooling fluid to said slip clutch means when it is partially engaged than when it is fully engaged.

7. In a power transmission, a slipping drive establishing means having an actuating chamber and an input means and an output means operatively connected to said drive establishing means and a centrifugal valve means responsive to the speed of said input means to automatically and infinitely vary engagement of said drive establishing means to infinitely vary the speed of said output means.

8. The invention of claim 7 further comprising a selector means having a first position for maintaining said slipping drive establishing means in fully engaged condition to transfer the full power output of said input means to said output means and a second position for maintaining said slipping drive establishing means in said variable engagement condition of operation.

9. The invention of claim 8 wherein said centrifugal valve means is secured to said input member and further comprising a stationary housing enclosing said control means, said selector control valve means having a housing secured to said stationary housing.

10. The invention of claim 8 further comprising an orifice means for communicating predetermined amounts of pressurized fluid to said chamber through a passage means arranged to communicate therewith when said selector valve means is maintained in said second position.

11. A power transmission comprising power input means, power output means, a slipping drive establishing means for operatively engaging said input means to said output means to vary the power transfer therebetween, said drive establishing means having a chamber, and control means for automatically pressurizing said chamber with a fluid to vary the engagement of said drive establishing means and thus the speed of said output means in response to the speed of said input means and for maintaining a substantially constant first pressure in said chamber up to a predetermined speed of said input means, for dropping to a second chamber pressure substantially instantaneously at said predetermined speed, said second pressure being substantially less than said first pressure, and for effecting a large increase in chamber pressure in response to a relatively small increase in the speed of said input means at a range of speeds greater than said predetermined speed.

12. The invention of claim 11 wherein said control means is further operative for maintaining said second chamber pressure substantially constant to prevent disengagement of the drive establishing means during a range of speeds greater than said predetermined speed but less than said last-mentioned range of speeds.

13. The invention of claim 11 wherein said control means comprises a centrifugal valve means for controlling the pressure in said chamber.

14. The invention of claim 13 wherein said centrifugal valve means comprises a spring means for aiding in effecting said large increase in chamber pressure in response to said relatively small increase in the speed of said input means.

15. In a power transmission having a stationary housing, a slipping drive establishing means having an actuating chamber and an input means and an output means, a centrifugal valve means secured to said input means and responsive to the speed of said input means to automatically vary engagement of said drive establishing means to vary the speed of said output means, a selector means operatively connected to said drive establishing means having a first position for maintaining said slipping drive establishing means in fully engaged condition to transfer the full power output of said input means to said output means and a second position for maintaining said slipping drive establishing means in said variable engagement condition of operation, said selector means having a housing secured to said stationary housing.

16. The invention of claim 1 wherein said auxiliary implement means comprises an elevating scraper ladder.

17. The invention of claim 1 wherein said auxiliary implement means comprises a loader bucket.

References Cited

UNITED STATES PATENTS

| | | | |
|---|---|---|---|
| 3,352,395 | 11/1967 | Hilpert | 192—105 |
| 3,358,796 | 12/1967 | Hilpert | 192—105 |
| 2,495,988 | 1/1950 | Sheppard | 192—103 X |
| 2,642,844 | 6/1953 | Flinn | 192—103 X |
| 2,874,591 | 2/1959 | Thoma | 74—710.5 X |
| 3,006,199 | 10/1961 | Christenson et al. | 74—730 X |
| 3,282,385 | 11/1966 | Synder | 192—103 X |

ARTHUR T. McKEON, *Primary Examiner.*

U.S. Cl. X.R.

74—665; 192—103